Nov. 21, 1950 K. L. KING 2,530,825

SYSTEM FOR SYNCHRONIZING THE SUPPLYING OF DEMODULATION CARRIER CURRENTS

Filed Aug. 5, 1948 2 Sheets-Sheet 1

INVENTOR
K. L. KING
BY H. A. Burgess
ATTORNEY

INVENTOR
K. L. KING
BY H. A. Burgess
ATTORNEY

Patented Nov. 21, 1950

2,530,825

UNITED STATES PATENT OFFICE 2,530,825

SYSTEM FOR SYNCHRONIZING THE SUPPLYING OF DEMODULATION CARRIER CURRENTS

Kenneth L. King, Scarsdale, N. Y., assignor to Bell Telephone Laboratories, Incorporated, New York, N. Y., a corporation of New York Application August 5, 1948, Serial No. 42,615

9 Claims. (Cl. 179—1.5)

This invention relates to synchronizing systems, and more particularly to such systems when arranged to coordinate the switching operations at the distant terminals of communication systems.

In my copending application Serial No. 691,853, filed August 20, 1946, there is described, and claimed, a signaling system in which secrecy of the transmitted message is obtained by altering the message signal by a modulation process in which, at one instant the modulating wave has one frequency value, and at a next succeeding instant it has a different value. The two frequency values of the modulating wave are so chosen that the upper sideband product of modulation that is produced when the wave has one frequency value, occupies substantially the same frequency position as does the lower sideband product of modulation produced when the wave has its second frequency value. The sidebands product of modulation, which alternately occupy the common-frequency band location, are then selected, to the exclusion of all other modulation products, and there is combined with them for transmission an unmodulated, or "false," carrier wave. This added unmodulated carrier wave alternately assumes the same two frequency values as those of the modulating wave, but assumes them in reverse frequency order with respect to the modulating wave. The selected common-frequency sidebands product of modulation then alternately assume the positions of an upper or lower sideband with respect to the transmitted unmodulated false carrier wave, but in either position the frequencies of the message wave are in inverted relation with respect to the transmitted false carrier wave.

At the receiving station, a demodulating carrier wave of substantially the same frequency as the modulating wave is resupplied to recover the message signal. It is necessary that the demodulating carrier wave change its frequency from one to the other value at substantially the same time as the frequency change occurs in the received modulated wave.

It is an object of the present invention to facilitate the coordination of the switching operations at two different locations such as at the transmitting and receiving terminals of a transmission link, which may be the above-described signaling system.

It is a further object of the invention to achieve the desired degree of switching coordination through the use of relatively economical means which are automatic and stable in operation.

These objects are attained in accordance with one embodiment of the invention by an energy-comparison and time-measuring circuit arrangement, whereby the instant at which the received false carrier wave is observed to change in frequency is utilized as a reference point for timing the receiving station switching operations. Provision is made for comparing the energy received in the false carrier wave during successive short intervals. When synchronous operation prevails, the false carrier wave is observed to change its frequency at the same predetermined time in each successive interval. As asynchronism appears, the time of frequency change in the false carrier deviates from its predetermined position in the comparison intervals, and corrective forces are produced which readjust both the time of occurrence of the succeeding comparison intervals, and the timing of the receiving station switching operations to agree with the revised conditions.

It is a feature of the invention that the transmitted false carrier wave is utilized for synchronization purposes in such a manner that no additional frequency space is required for the synchronization purposes.

It is also a feature of the invention that it permits of rapid self-correction in such manner that minor variations in the circuit components or voltages have no effect upon its operation.

It is a further feature of the invention that the operating phase of the timing elements of the invention are coordinated in a simple and novel manner whereby the time of inception of each comparison interval is maintained in substantially constant time relation to the receiving station switching operations.

The manner in which the invention achieves the above-described objects will be best understood from the following detailed description of one embodiment, when considered in conjunction with the drawing in which.

Figure 1:
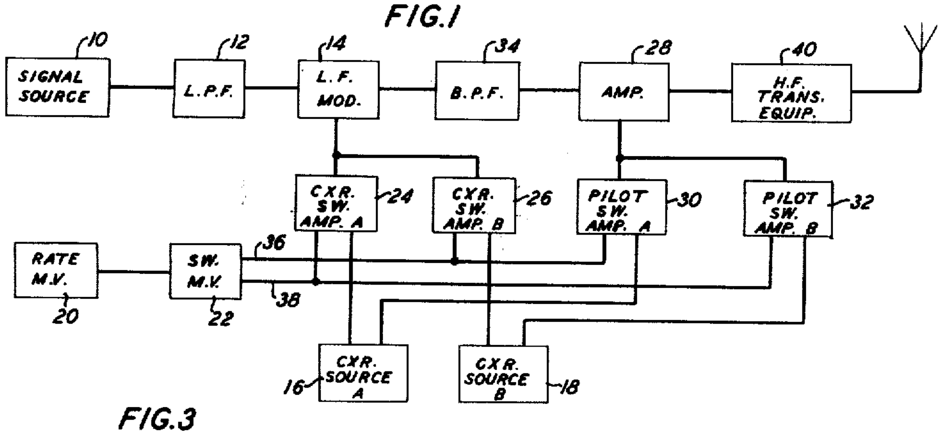
Fig. 1 is a block diagram of the transmitting station signaling equipment.

In Fig. 1 source 10 supplies signal waves through a conventional low-pass filter 12 to modulator 14. Filter 12 may have any suitable pass band for example 250 to 3000 cycles per second. Modulator 14 may be of any suitable design such as the conventional balanced unit utilizing copper oxide varistor elements. Filter 34 may be a band pass type of unit in which the pass band is related to the frequencies of sources 16 and 18 in the manner which will be later described. Amplifier 28 may be any suitable linear device having two input circuits. Multivibrators 20 and 22 may be symmetrical structures of conventional design, and for purposes of this disclosure, may be assumed to operate at 4 and 2 cycles per second, respectively. To secure added accuracy, multivibrator 20 may operate at twice the frequency of unit 22, and deliver simultaneous control impulses to both control electrodes of unit 22. Switching amplifiers 24, 26, 30, 32 may be conventional pentode or other suitable units in which the control electrode biasing voltages are so arranged that the amplifier is non-conductive in the absence of a positive voltage of a predetermined magnitude on one of the auxiliary grid electrodes. Multivibrator 22 provides positive voltage pulses on interconnecting leads 36, 38. These pulses, which are derived from opposite sides of unit 22, are 180 degrees out of phase, and are of sufficient magnitude to induce conduction in the switching amplifiers 24, 26, 30 and 32 when applied to an auxiliary electrode of the amplifiers. Carrier supply sources 16 and 18 may be relatively stable crystal controlled oscillators, or other suitable periodic elements, the frequencies of oscillation of which differ by an amount that is equal to, or greater than the message bandwidth to be transmitted plus twice the value of the lowest message frequency to be transmitted. For purposes of this disclosure, the frequency of source 16 may be assumed to be 100.00 kilocycles per second, and that of source 18 may be assumed to be 103.25 kilocycles per second. Under these conditions, the pass band of filter 34 should extend from about 100.25 to 103.0 kilocycles per second, when filter 12 passes a frequency band from 250 to 3000 cycles per second. It should be understood that these frequency values are cited by way of example, and in no way represent a limitation upon the operating range of the invention. As positive voltage pulses from multivibrator 22 are applied to connecting circuit 38, oscillations from source 16 are supplied through carrier switching amplifier 24 to modulator 14, and oscillations from source 18 are supplied through pilot switching amplifier 32 to the combining amplifier 28. Similarly, when the positive voltage pulse appears on conductor 36, modulator 14 is supplied with oscillations from source 18 through amplifier 26, and oscillations from source 16 are supplied through amplifier 30 to combining amplifier 28.

The operation of this circuit may be visualized if it is assumed that at one instant there is a positive voltage pulse on connecting circuit 38. A 100-kilocycle carrier frequency wave from source 16 will then be passed through switching amplifier 24 to modulator 14, while at the same time, a 103.25-kilocycle carrier frequency wave from source 18 will be passed through pilot switching amplifier 32 to combining amplifier 28. During the next succeeding quarter-second the positive pulse from multivibrator 22 is removed from connecting circuit 38, and is applied to connecting circuit 36, under which circumstances 103.25-kilocycle carrier frequency from source 18 is supplied to modulator 14, and 100-kilocycle carrier frequency from source 16 is supplied through pilot switching amplifier 30 to combining amplifier 28, where it is utilized as a false carrier frequency. When the carrier frequency of 100 kilocycles per second is modulated with the signal wave of frequency 250 to 3000 cycles per second, there is produced, in addition to other modulation products, an upper sideband product of modulation which occupies a frequency position of 100.25 to 103 kilocycles. Similarly, when carrier frequency from source 18 is modulated by this same signal wave, there is produced, in addition to other modulation products, a lower sideband product of modulation which occupies this same frequency position of 100.25 to 103 kilocycles. The pass band of filter 34 is sufficient to pass only the modulation product which lies in this common-frequency band, namely, 100.25 to 103 kilocycles per second. Coincident with this operation, in amplifier 28 there is added to these selected sidebands product of modulation, the false carrier frequency from either source 16 or 18, depending upon which source is being modulated to produce the sideband product. These combined wave components are then further treated in the high frequency transmitting equipment 40 for transmission to the distant receiving point.

Figure 2:
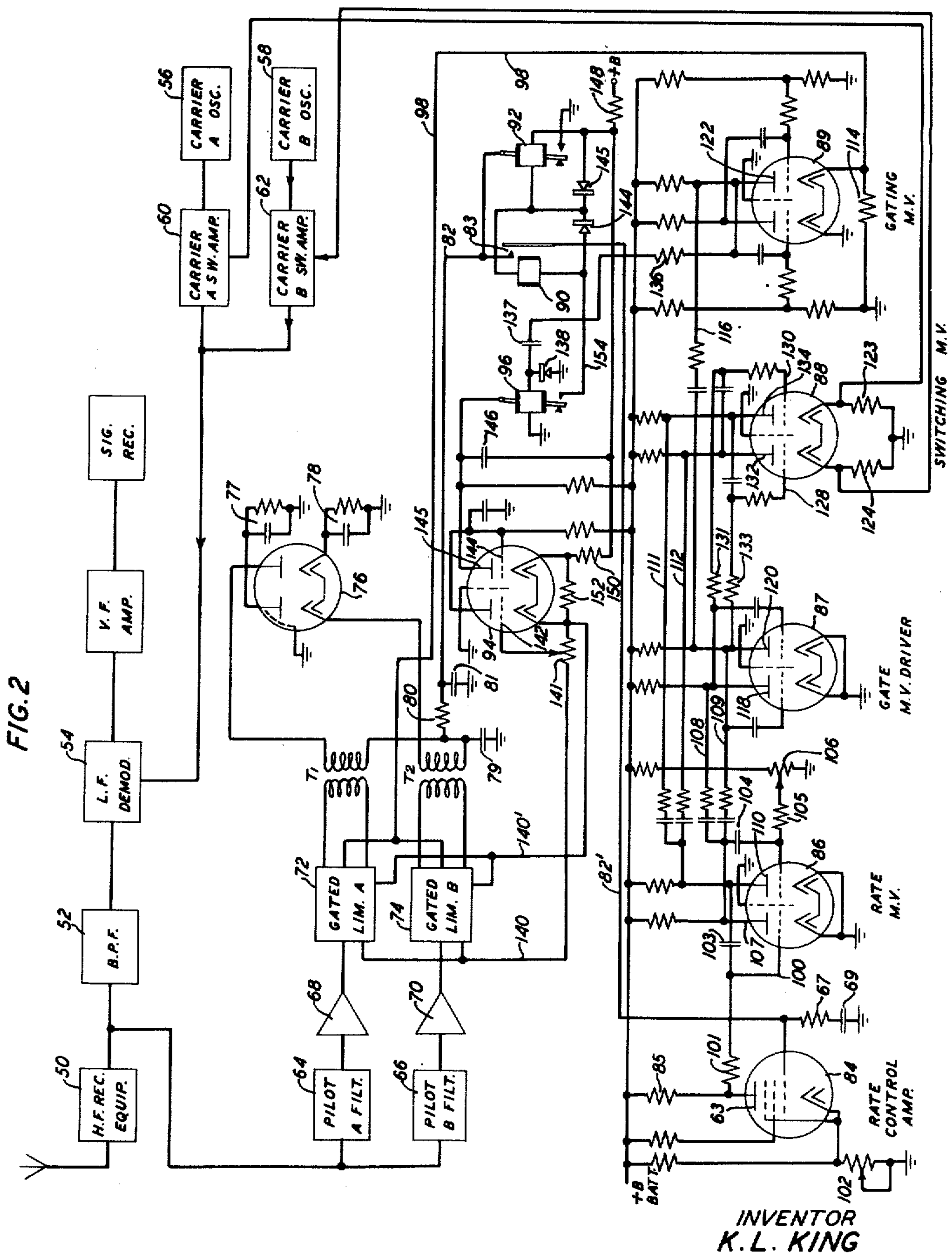
Fig. 2 is a combined block and schematic diagram of the receiving station signaling and synchronizing equipment.

In Fig. 2, the high frequency receiving equipment 50 reduces the frequency of the incoming message signal to an intermediate band of approximately 100 to 103.25 kilocycles. Band pass filter 52 may have the same frequency characteristic as transmitting station filter 34, namely, 100.25 to 103 kilocycles per second. The received filtered band of frequencies is combined in demodulator 54 with the proper demodulating carrier frequency obtained from carrier source 56 or 58. These carrier sources may be crystal-controlled oscillators having frequencies that are substantially the same as those at the transmitting station, namely, 100 kilocycles and 103.25 kilocycles. Carrier switching amplifiers 60, 62 may be pentode amplifiers which are normally non-conductive in the absence of a positive voltage pulse on one of their control grid electrodes. Pilot filters 64, 66 may be crystal filters of about 25 cycles per second bandwidth, the center frequencies of which are located at about 100 kilocycles per second and about 103.25 kilocycles per second, respectively. Amplifiers 68, 70 restore the level of the respective false carriers before they are applied to the gated limiters 72, 74. These limiters, which may be of conventional design and operation, have their control voltages adjusted such that they are non-conductive until a positive voltage of predetermined magnitude is supplied to a control electrode of each one. By supplying this positive control voltage to each limiter in the form of a voltage pulse, the limiter may be "gated," enabled, or made conductive, for the duration of the pulse. When so operated, each limiter acts as a device for sampling the received false carrier wave for intermittent short periods. The limiters 72, 74, in conjunction with transformers T1, T2 and rectifying element 76, together with its capacitor-resistor load circuits 77, 78, act as a differential device to produce across capacitor 81 a unidirectional electromotive force, the polarity of which with respect to the common ground terminal depends upon which of the two false carrier frequencies predominates during the preceding sampling intervals. This electromotive force is applied over interconnecting circuits 82, 82′ and relay contacts 83 to the control electrode of the rate control amplifier 84. Rate control amplifier 84 may take any convenient form, such as a pentode amplifier, in which the voltage drop across its anode resistor 85 is controlled by the electromotive force applied to its control electrode over interconnecting circuit 82'. Electron discharge devices 86, 87, 88 and 89 form a series of multivibrator oscillators, the purpose of which is the production of positive voltage pulses to control the switching of the carrier frequency sources 56, 58, to control the operation of the gated limiters 72, 74 and also to control the sampling of the voltage derived across condenser 81. Electron discharge device 94, together with its associated circuit and relays 90, 92 and 96 form a control device for discarding the unidirectional voltage, which is developed across capacitor 81, during periods when one or both of the false carrier frequencies may be unduly attenuated.

Since the time of changing the demodulating carrier frequency is reckoned from the time of observing the frequency change in the false carrier wave, it is necessary that the switching and gating, or sampling, operations be performed synchronously, but not necessarily in entire coincidence. In order that the frequency change in the false carrier may occur within the sampling period, it is necessary to originate the gating pulse across cathode resistor 114 of gating multivibrator 89 in advance of this change. This being true, and since the transmission delay through filter 64, or 66, exceeds that through filter 52, the gating operation must lead one of the switching changes by a predetermined interval. If it is desired that the false carrier frequency change occur midway in the sampling period, this lead interval must equal one-half of the sampling interval minus the difference in the transmission delays through the filter circuits.

These sampling and switching operations are controlled by positive voltage pulses which are derived from multivibrators 88, 89. Therefore, to effect the desired correlation between the generated voltage pulses, the multivibrators 86, 87, 88, 89 are interconnected in the following manner. Multivibrator 86 is made asymmetrical by properly proportioning capacitor 104 and resistors 105, 106 with respect to capacitor 103 and resistor 101, such that the right side of the unit is nonconductive for a time interval that is equal to the interval by which the gating, or sampling, operation must precede the corresponding switching operation. Control electrode 100 is connected through resistor 101 to anode 63 of rate control amplifier 84. Anode 107 is connected to both control electrodes of multivibrator 87 over connecting circuits 108, 109 to anodes 118, 120.

Similarly, anode 110 is connected to both control electrodes of multivibrator 88 over connecting circuits 111, 112 to the anodes 132, 134. Cathode resistors 123, 124 in the anode-cathode circuits of switching multivibrator 88 serve to generate positive voltage pulses in the usual manner. Gating multivibrator 89 is an asymmetrical unit. In accordance with conventional design practices, the control electrode bias voltages, the plate and grid resistors and the coupling capacitors may be so chosen that current flows from anode 122 through cathode resistor 114 for a time equal to the duration of the desired sampling interval, during which the "false" carrier wave frequency components are to be compared. Anode 122 is connected to the armature winding of relay 96 through the pulse conducting circuit comprising resistor 136 and capacitor 137.

Amplifier 94 may be a direct coupled amplifier, the left side of which is normally non-conductive because of the negative potential which its control electrode 142 derives from potentiometer 141. Potentiometer 141 is included in the control grid-cathode circuits of the gated limiters, 72, 74, and under normal operating conditions its cathode end is made relatively positive by the grid current which is drawn by these limiters. The right half of amplifier 94 is normally conductive because of the high positive control bias on grid electrode 144. The lower plate of capacitor 146 is connected to a voltage divider comprising resistors 148, 150, 152 and a cathode biasing resistor (not shown) in gated limiter 74. The potential at this lower plate exceeds the upper plate potential of capacitor 146 by about 30 volts when anode 145 is conducting current. When anode 145 is nonconductive, its potential, and that of the anode plate of capacitor 146, exceeds the lower plate potential by about 30 volts. The armature windings of relays 90, 92 and the armature contact of relay 96 are in series arrangement across capacitor 146. Unidirectional conducting devices 144 and 145 are shunted across relay windings 90, 92, respectively, and are poled such that each one forms a virtual short circuit across its associated relay winding for a given polarity of potential difference. Device 138 is shunted across the winding of relay 96 in similar fashion to act as a short circuit for negative potential differences.

The operation of the receiving circuit arrangement may be understood from the following description, in which it is assumed that the "false" carrier wave changes its frequency from 100 kilocycles per second to 103.25 kilocycles per second, and vice versa, at the rate of two cycles per second. Under these circumstances, the gated limiters 72, 74 are made conductive for two short sampling periods during each second, and demodulator 54 is connected to each of carrier sources 56, 58 twice each second. The transmitted wave, comprising the message signal in the form of a sideband product of modulation, together with the false carrier wave, is received by the high frequency receiving equipment 50, and is reduced to an intermediate frequency of about 100 kilocycles. The sideband product of modulation is selected by band pass filter 52, and is passed to the demodulators 54. Pilot filters 64, 66 act to segregate the false carrier wave into its two frequency components. These selected frequencies are amplified by amplifiers 68, 70 and are applied to the input circuit of normally nonconductive gated limiters 72, 74. Limiters 72, 74 are made conductive twice a second by positive voltage pulses received over path 98 from multivibrator 89. During the period of each positive voltage pulse, which are initially timed such that the false carrier changes from one to the other of its frequency values during the pulse interval, the 100-kilocycle false carrier is passed by limiter 72, and the 103.25-kilocycle frequency is passed by limiter 74. Rate control rectifier 76, which may comprise a pair of diode rectifying elements, includes in its input circuit the coupling transformers T1 and T2, and in its load circuit the capacitor-resistor load networks 77, 78. Transformers T1 and T2 are differentially connected in this circuit such that there is developed across the filter structure comprising capacitor 79, resistor 80 and capacitor 81, a unidirectional voltage, the polarity of which is dependent upon which false carrier frequency is in the preponderance during the sampling interval, and the magnitude of which depends upon the degree of preponderance. By proportioning the size of capacitor 81 to be several times as large, for example fifty times as large, as that of capacitor 79, the derived electromotive force may be properly shaped and applied to coordinate the switching of carrier oscillators 56, 58 in a much shorter time than would be possible if the capacitors were of about equal sizes. The derived electromotive force is applied over interconnecting circuit 82, 82′, and relay contact 83, to the control electrode of rate control amplifier 84. The voltage drop across load resistor 85, and hence the voltage at rate control amplifier anode 63, is a function of the magnitude of this applied electromotive force.

Figure 3:
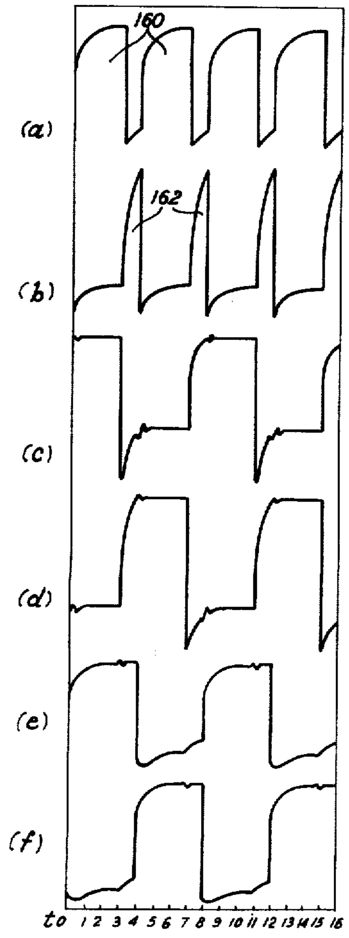
Figs. 3 and 4 are wave form curves to which references are made in the detailed description.

Rate control multivibrator 86 is a free-running four-cycle oscillator. The wave forms and relative timing of the voltage fluctuations at its anodes 107, 110 are indicated by curves (*a*) and (*b*), respectively of Fig. 3. If it be assumed, for purposes of this description, that the incoming false carrier wave is repeatedly changing in frequency at the midpoint of the sampling periods, then no differential voltage will exist across capacitor 81, and ground potential will be received from connecting circuit 82′. As the potential at anode 107 drops at time $t_7$, a negative voltage pulse is transmitted over paths 108, 109 to both control electrodes of gate multivibrator driver 87, which forces conduction in one, or the other, side of this multivibrator. The timing and wave form of the potential fluctuations at anodes 118, 120 are indicated by curves (*c*) and (*d*) (Fig. 3), respectively. Concurrent with the reduction of potential at anode 120, at time $t_7$, a negative pulse is delivered over path 116 to anode 122 of gating multivibrator 89. This pulse action synchronizes current conduction in multivibrator driver 87, and produces across cathode resistor 114 a positive voltage, or gating, pulse 180 which is applied over path 98 to the gated limiters 72, 74. This action is indicated at time $t_7$ of curves (*d*) and (*e*) (Fig. 4), which respectively indicates voltage variations at anode 122 and across cathode resistor 114.

Figure 4:
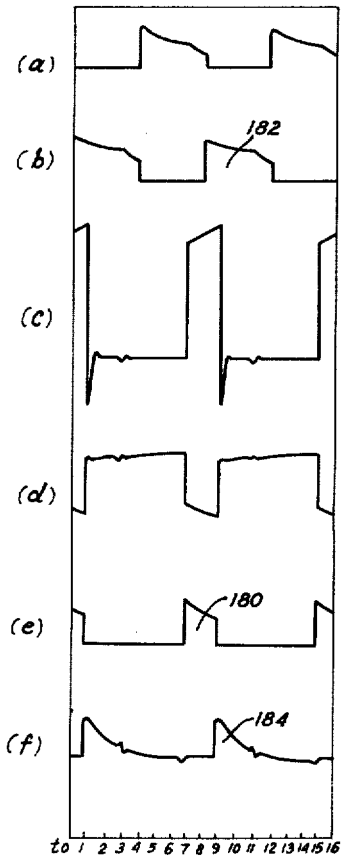

It will be recalled that the polarity of the unidirectional voltage, which is derived by rate control rectifier 76 from the compared samples of the false carrier wave, is determined by which frequency component is preponderant during the sampling interval. This voltage, acting through the control electrode of rate control amplifier 84, acts to advance or retard the switching action at the receiving station by increasing or decreasing the frequency of rate multivibrator 86. Because of this interrelation between frequency preponderance during the sampling interval and rate of switching, and because it is necessary to not only change the frequency of the demodulating wave supplied to demodulator 54 at the proper instant, but also to change it to the proper frequency at the proper time, it is necessary that the current conduction in switching multivibrator 88 be closely coordinated with respect to current conduction in multivibrator 87. For this description we will assume that it is desired that multivibrator 88 conduct current through its anode 132, when anode 118 of the gate multivibrator drive 87 is also conducting current. Also, in order that the gating, or sampling pulse, to gated limiters 72, 74 may be properly timed with respect to its corresponding switching pulse, it is desired that the start of current conduction through anode 132 always be delayed after the start of conduction through anode 118 by an interval that is equal to the short side cut-off period of rate multivibrator 86. As rate multivibrator 86 continues in its cycle, the potential at its anode 110 decreases at time $t_8$, as current conduction starts through anode 110. The time interval between times $t_7$ and $t_8$ are made equal to one-half the sampling, or gate, interval minus the difference in transmission delays through filters 52 and 64 or 66, by choosing suitable values for capacitor 104 and resistors 105, 106. At time $t_8$ the negative voltage pulse from anode 110 is applied over pulse conducting paths 111, 112 to both control electrodes 128, 130 and causes switching multivibrator 88 to reverse its conductive state. In the absence of any additional control forces, the multivibrators 87 and 88 would operate synchronously, but there would be no certainty that they would conduct current in the proper relative sequences. In other words, multivibrator 88 might start conduction on either its right or left side shortly after the multivibrator 87 started conduction on its left side. Under these conditions, the frequency of the demodulating carrier wave, which is supplied from sources 56, 58, might be changed substantially 180 degrees out of the desired phase relation. This difficulty is avoided by maintaining control electrode 128 at a relatively low potential until current flow is started in the left side of multivibrator driver 87, and by mantaining electrode 130 at a relatively high potential when current flows in the right side of multivibrator 88. This condition is brought about by connecting electrodes 128, 130 to anodes 120, 118 through resistors 133, 131, respectively. Although fortuitous circumstances will control which side of multivibrator 87 initially conducts current each time the equipment is energized, the interconnected electrodes will cause the current flow in multivibrator 88, and hence the switching operation, always to be in the desired phase relation with respect to the sampling, or gating, interval. Therefore in the assumed example, at time $t_8$, when negative voltage pulses from anode 110 are delivered to both control electrodes 128, 130, current conduction is forced in the right side of switching multivibrator 88, and the potential at anode 134 decreases as indicated in curve (*f*), Fig. 3. Curve (*e*), Fig. 3 indicates the corresponding potential at anode 132. Fig. 4 curves (*a*) and (*b*) show the wave forms of the switching voltage pulses, which are generated across the cathode resistors 124, 123, respectively. It may be noted that the start of switching pulse 182 (curve (*b*) Fig. 4) occurs at time $t_8$, and lags the sampling pulse 180 (curve (*e*) Fig. 4) which starts at $t_7$.

The switching pulse 180, curve (*e*) Fig. 4, is terminated at time $t_9$, coincident with the cessation of current flow through anode 122 of multivibrator 89. As the potential at this anode increases, curve (*d*) Fig. 4, there is generated across the armature winding of relay 96 a positive voltage pulse 184, curve (*f*), Fig. 4. This pulse is produced by the inability of capacitor 137 to follow the rapid change in potential at anode 122. A unidirectional conducting element 138, which may be a germanium varistor, is connected in shunt across the winding of relay 96 in such manner that it shorts the relay winding whenever negative voltage pulses are delivered through the connecting circuit from anode 122. Since anode 122 of multivibrator 89 regains its positive potential at the end of the gating or sampling period, it is apparent that relay 96 is operated after each sampling period, when the two false carrier frequencies have been compared in the comparison circuit 76.

Electron discharge device 94, together with its other circuit components, comprises a direct coupled amplifier the operation of which controls the operation of relays 90, 92 and 96, in a manner which will now be described. The control electrodes of the gated limiter 72, 74 are normally driven positive by the false carrier in each circuit branch. The control electrodes of these limiters are connected through connecting circuit 140 to potentiometer 141, to which the control electrode 142 of direct coupled amplifier 94 is also connected. During periods of normal operation when the false carriers are at their normal level, grid current flow through potentiometer 141 biases the control electrode 142 of amplifier 94, to its cut-off potential. Control electrode 144 of amplifier 94 assumes the high anode potential, and amplifier 94 conducts current on its right side, which includes anode 145. Resistors 148, 150, 152 and a cathode resistor (not shown) in gated limiter 74, interconnected over lead 140', form a voltage divider, which holds the lower plate of capacitor 146 at a predetermined voltage level. When the right side of amplifier 94 is conducting current, the potential at anode 145, and at the plate side of capacitor 146, is negative with respect to the voltage derived by the lower side of capacitor 146 from the voltage divider. Under these circumstances as relay 96 is operated by the positive voltage pulse derived from multivibrator 89, it delivers a relatively negative voltage through its armature contact to connecting circuit 154. The unidirectional conducting device 145, which may be a germanium varistor, is poled such that it short-circuits the winding of relay 92 when a relatvely negative voltage is received from the upper plate of capacitor 146. Unidirectional device 144, which may also be germanium varistor, is poled such that it is ineffective during the negative voltage period, and relay 90 is operated. Any unidirectional voltage which has been developed across capacitor 81 by the rate control rectifier 76 is then delivered through relay contact 83 to interconnecting circuit 82', where it is stored on the control electrode holding circuit 67, 69 of rate control amplifier 84.

If selective fading conditions cause one, or both, of the false carrier frequencies to be unduly attenuated, one, or both, of the gated limiters 72, 74 fails to draw grid current during its positive excitation, and control electrode 142 of direct coupled amplifier 94 assumes a potential which induces current flow in the left side of this amplifier. Current flow in the left side of amplifier 94 reduces the control potential of electrode 144, and extinguishes current conduction in the right side of the amplifier. This action increases the potential at anode 145 sufficiently to cause the anode side of capacitor 146 to be positive with respect to its lower plate. Under these circumstances as relay 96 is operated by the positive voltage pulse 184, which is derived from multivibrator 89, it delivers a relatively positive voltage to interconnecting circuit 154. Varistor 144 effectively short-circuits the winding of relay 90, and prevents the operation of this relay. Varistor 145 is poled such that it is ineffective during the positive voltage interval, and relay 92 operates to connect ground potential through its armature contact to interconnecting circuit 82. This action effectively discards the erroneous, or useless, voltage developed across capacitor 81 during a low level period. During periods of selective fading this arrangement prevents the generation of false synchronizing information, which might result from one false carrier wave frequency being attenuated more severely than its companion during the sampling, or gate, interval.

The foregoing description has been based on the assumption that the change in frequency of the "false" carrier wave occurs at the midpoint of the sampling period. As this frequency change deviates from this position, a greater amount of power is received at one frequency than at the other, and the rate control rectifier 76 generates a voltage across capacitor 81. This voltage acts through the rate control amplifier 84, to increase or decrease the frequency of rate multivibrator 86, and change the time of occurrence of the gating pulse 180 (curve (e) Fig. 4) to restore the frequency change-over to its midposition in the samping interval.

Although one embodiment of the invention has been described as utilizing certain stated values for the false carrier wave frequencies, and as operating at switching and sampling rates of two cycles per second, it should be appreciated that any other suitable frequencies may be successfully employed in practicing the invention. Similarly, the invention has been described as a method of, and means for, synchronizing the switching operations at the receiving terminal of a particular type of signaling system. However, the invention is not restricted to the described arrangement, and it may be expected that various embodiments of the invention, which differ in structure, but which do not depart from the spirit and scope of the invention, will occur to those skilled in the relevant art.

What is claimed is:

1. In a single sideband signaling system wherein the received wave comprises an unmodulated false carrier wave component which alternately assumes one of two diverse frequency values, and a sideband product of modulation which is derived by the modulation of a message signal wave with a carrier frequency wave the frequency of which alternately assumes one of two diverse frequency values, a system for demodulating said sideband product of modulation which comprises electric network means to separate said false carrier wave component from said sideband product of modulation, a source of carrier frequency waves of two different frequencies which are substantially equal to the frequencies of the carrier wave from which said sideband product was derived, means for modulating said carrier wave of either frequency with said received sideband product of modulation, means for continuously impressing said sideband product of modulation upon said modulatory means, means for delivering said modulating carrier waves of different frequencies in alternation to said modulatory means, means for deriving from said received false carrier wave component an electromotive force the polarity of which with respect to an arbitrary reference is determined by the relative amounts of each of said diverse frequencies which are received during a predetermined interval, and means responsive to said electromotive force for regulating the time of alternation in the delivery of said two different frequency modulating carrier waves to said modulation means.

2. A method for synchronizing the time of alternating a supplied demodulating carrier wave from one to the other of two diverse frequency values to coincide with corresponding changes in the frequency of a transmitted modulated carrier frequency wave, which method comprises transmitting with said modulated wave an unmodulated false carrier wave which alternately assumes one or the other of two diverse frequency values, receiving said carrier frequency wave, separating said received false carrier wave into its two frequency groupings, comparing the amount of said waves in each frequency group that is received during a known interval, which interval includes the instant said received false carrier wave changes its frequency value, alternating the frequency of said supplied demodulating carrier wave at a time which corresponds to the receipt of equal amounts of each frequency of said false carrier wave during said known interval, and advancing or retarding the time of alternating the frequency of said demodulating wave depending upon which of said frequencies of said false carrier wave is received in the greatest amount during said comparison interval.

3. In a communicating system including a transmitting and a receiving station, means at said stations for generating two diverse frequency waves, means for alternately switching said waves, means for transmitting said alternately switched waves, at said receiving station, selective means for separating and intermittently receiving said waves, comparison means for deriving a signal the character of which is controlled by the proportion of each of said diverse frequency waves received during said intermittent reception periods, means responsive to said derived signal for advancing or retarding the time of occurrence of said intermittent periods of reception, and means responsive to said derived signal for controlling the switching of said diverse frequency waves to demodulate a modulated transmitted signal wave.

4. In a system for synchronizing the switching operations of differently located transmitting and receiving switching devices, means for transmitting a continuous wave, means under the control of said transmitting switching device for changing the frequency of said transmitted wave from one to another value, at a receiving station, means for receiving said wave, means for sampling said wave at recurring equal intervals, means for deriving from said sampled portions of said wave an electromotive force the polarity of which is determined by the relative amount of each frequency which is received during said sampling period, oscillatory means for controlling said sampling period, oscillatory means for controlling said receiving end switching operation, means responsive to said derived electromotive force for controlling the operation of said sampling and said switching controlling oscillatory means, and means for maintaining a substantially constant phase relation between said oscillatory means.

5. A system for synchronizing switching operations at transmitting and receiving stations which comprises at said transmitting station a source of carrier frequency oscillations, switching means for repetitively changing the frequency of said oscillations from one to the other of two frequency values, means for transmitting said alternate frequency carrier waves, at said receiving station a second switching means to repetitively change from one to another of two conditions, means for intermittently receiving said waves for recurring equal intervals of predetermined duration, which intervals include the instant of frequency change in said received waves, means for determining and comparing the energy received in each frequency component of said wave during said receiving interval, means responsive to said comparison for variably controlling the time of occurrence of said receiving intervals to cause said received energy to assume a predetermined relative relationship, and means responsive to said energy comparison for controlling said receiving switching operation at the desired rate when said received energies are in the desired predetermined relative relationship.

6. In a synchronizing system, means for receiving a transmitted wave the frequency of which alternately assumes one or the other of two frequency values for substantially equal intervals of time, a switching device that alternately assumes one of two conditions at substantially the same rate of change as the changes in frequency in said wave, means for intermittently further receiving said wave for intermittently received equal intervals, means for deriving from said recurring wave portions a unidirectional electromotive force the polarity and magnitude of which is responsive to the degree that one frequency component exceeds the other frequency component in said wave during said recurring equal intervals, means responsive to polarity and magnitude changes in said derived electromotive force for advancing and retarding the times of occurrence of said intermittent receiving intervals and also the switching operation of said switching device in such manner that the midpoint of said intermittent receiving interval is maintained in substantial coincidence with the time of frequency change in said intermittently received wave, and said switching operations of said device are maintained at a predetermined time relationship relative to said frequency changes.

7. A synchronizing system at the receiving station of a signaling system for synchronously coordinating switching operations at said station with the time of occurrence of frequency changes in a received wave, said system comprising a pair of electrical networks for dividing the received wave into diverse frequency groups, amplifying means for intermittently receiving and limiting the amplitudes of the wave components of each frequency group to a predetermined maximum value, a differentially connected unilaterally conducting device for deriving from said intermittent, amplitude limited wave groups a unidirectional voltage, the polarity and magnitude of which is dependent upon the relative energy content of each amplitude limited wave group, controlled oscillatory means for deriving a first series of enabling voltage pulses and a second series of switch controlling voltage pulses, connecting means for supplying said first series of enabling pulses to said amplifying means to render said means conductive only during said pulse intervals, means responsive to said derived unidirectional voltage for controlling the operation of said controlled oscillatory means, and means for maintaining a desired interval between the time of occurrence of said enabling and switching voltage pulses.

8. A synchronizing system in accordance with claim 7 in which the controlled oscillatory means comprises a plurality of multivibrator oscillators one of which produces said second series of switch controlling pulses, and one of which controls the production of said first series of enabling voltage pulses, each of said multivibrators including a pair of electron discharge devices, each of said devices including anode and control electrodes, and in which said means for maintaining a desired interval between said pulses comprises a resistance connection between each control electrode of said switch controlling multivibrator and a separate one of the anodes of said enabling pulse controlling multivibrator so that the potential of each control electrode of said switch controlling multivibrator fluctuates as the potential of the respective connected anode of said enabling pulse controlling multivibrator fluctuates and said switching multivibrator is controlled synchronously with but is maintained in fixed time delay respective to said enabling pulse controlling multivibrator.

9. In a synchronizing system which comprises a first controlling multivibrator oscillator and second and third controlled multivibrator oscillators, each of said multivibrators including a pair of electron discharge devices having anode and control electrodes, means for connecting said first multivibrator to said controlled multivibrators whereby said controlled multivibrators operate in response to impulses received from said first multivibrator, said means comprising a pulse conducting path between only the first anode of said first multivibrator and both control electrodes of said second multivibrator, and a second pulse conducting path between only the second anode of said first multivibrator and both control electrodes of said third multivibrator, and means for initiating current flow in said second and third multivibrators in a substantially constant desired phase relationship, said means comprising a conductive path between the second anode of the second multivibrator and one control electrode of the third multivibrator, and a second conductive path between the first anode of the second multivibrator and the other control electrode of said third multivibrator, so that the potential of each control electrode of said third multivibrator varies as the potential of the respective connected anode of said second multivibrator varies and control impulses from said first multivibrator cause said third multivibrator to always conduct current in the desired relative relationship with respect to said second multivibrator, but delayed in time with respect to that multivibrator.

KENNETH L. KING.

REFERENCES CITED

The following references are of record in the file of this patent:

UNITED STATES PATENTS

| Number | Name | Date |
|---|---|---|
| 1,592,940 | Kendall | July 20, 1926 |
| 2,153,052 | Rodwin | Apr. 4, 1939 |
| 2,212,447 | Mathes | Aug. 20, 1940 |
| 2,269,594 | Mathes | Jan. 13, 1942 |
| 2,293,501 | Hansell | Aug. 18, 1942 |
| 2,309,678 | Smith | Feb. 2, 1943 |
| 2,389,948 | Bartels | Nov. 27, 1945 |